March 25, 1952     C. H. W. HARTMANN     2,590,313
TUBULAR CHART DEVICE
Filed May 26, 1949

INVENTOR
CARL H.W. HARTMANN
BY
Kenyon & Kenyon
ATTORNEYS

Patented Mar. 25, 1952

2,590,313

UNITED STATES PATENT OFFICE 2,590,313

TUBULAR CHART DEVICE

Carl H. W. Hartmann, Tulsa, Okla., assignor to Geophysical Research Corporation, New York, N. Y., a corporation of New Jersey Application May 26, 1949, Serial No. 95,410

4 Claims. (Cl. 346—138)

This invention relates to tubular chart devices used by certain recording instruments operating under conditions requiring compactness. The recording tool is mounted inside the tubular chart to work against the chart's inside upon relative recording movements of the chart and tool.

An example of such an instrument is disclosed by the F. M. Kannenstine Patent 1,837,222, issued December 22, 1931. This is a recording pressure gauge adapted to be lowered into an oil well with the tubular chart moved axially by a clockwork mechanism and the recording tool moved circumferentially respecting the chart by a pressure measuring device.

Such an instrument includes a tubular chart holder providing a cylindrical bore in which the chart is removably positioned so it may be replaced by a new chart after each recording. The chart should be held so that its inside is cylindrical throughout. With this as an object the chart has heretofore had as a base a rectangular sheet of metal that is elastically deformable to a degree permitting it to be sprung inside the cylindrical bore of the chart holder. The chart's inherent elasticity causes it to conform to the cylindrical bore to a greater or lesser degree.

Considerable difficulty has been experienced in providing an arrangement causing the chart to assume consistently a truly cylindrical shape throughout. In the mentioned patent the tubular bore of the chart holder is shown provided with longitudinally extending ridges which are engaged by the edges of a paper sheet on which the record is made. The springy metal sheet type of chart has been used instead of paper in the commercial form of the instrument. If commercially the charts could be made with circumferential lengths exactly equaling the circumferential distance between the ridges and if the latter and the chart edges could be made exactly parallel, it is conceivable that the chart could be held cylindrical throughout. Commercially, however, presently available manufacturing techniques cannot attain such a degree of dimensional perfection.

Prior to the present invention the commercial instrument had been developed to a point where the chart holder's ridges had been substituted by a longitudinally extending bar of T-shaped contour with the arms of this shape providing overhanging ledges under which the chart edges could be slid when the chart was tubed and pushed longitudinally into the holder. Until the present invention this was the best arrangement known for maintaining the tubular chart with a shape throughout most exactly coinciding with the cylindrical inside of the tubular chart holder. This T-bar arrangement, however, has been deficient in holding the longitudinally extending edge portions and the adjacent circumferential end portions of the chart in conformity with the cylindrical bore. These portions straighten slightly to form longitudinally extending flat panels. This end paneling has been a defect because the recording tool at times works close to at least one of these portions which persist in paneling. The extent of the paneling is not consistent and cannot be predicted or determined. Therefore, errors appear in the ultimate record made on the chart. The cost of this T-bar device is high since the bar must be made and installed by precision methods.

With the foregoing in mind one of the objects of the present invention is to provide a commercially practical tubular chart device, assembly or arrangement whereby to hold such a tubular chart in a truly cylindrical position throughout all of its portions. Another object is to so hold the chart in a manner permitting easy positioning and removal of the chart particularly when operating under field conditions.

Due to the relative movement between the chart and recording tool forces are created tending to dislocate the chart unless it is positively positioned with adequate firmness. Therefore a further object of the present invention is to provide for attainment of the above mentioned objectives while adequately meeting this requirement of firmly anchoring the chart in position during its use. Other objects may be inferred from the following.

A specific example of the present invention is disclosed hereinbelow with the aid of the accompanying drawings for the purpose of explaining the principles and operation of the invention. These principles and operation may be used in other forms than are thus disclosed for this teaching purpose.

The accompanying drawings illustrate this example which is adapted for use in the well known oil well recording pressure gauge made in accordance with the principles of the mentioned patent. The various figures are as follows.

Figure 1:
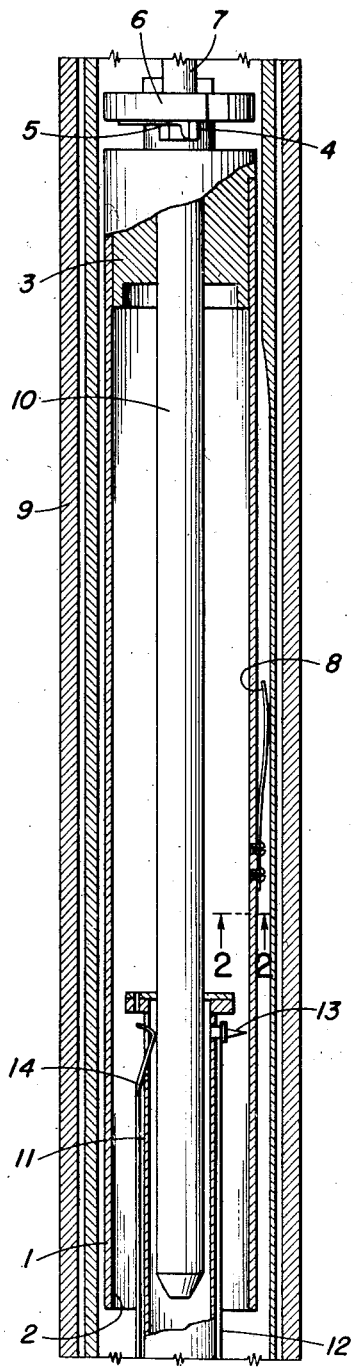
Fig. 1 is a vertical section of the portion of the pressure gauge where the chart holder is located.

In Fig. 1 the tubular chart holder 1 is shown with its cylindrical bore 2 which is finished as precisely cylindrical as precision manufacturing methods permit. The chart holder's upper end is engaged by the chart holder end 3 which connects with the push rod nut 4 through the nut retainer 5. The usual chart holder lift 6 is also shown. The chart holder is pushed downwardly by the push rod 7 during the operation of the instrument, the nut 4 being screwed on this rod's lower end to interconnect the parts. The chart holder spring 8 is screwed to the outside of the chart holder to press radially outwardly against the inside of the inner housing 9 of the instrument. The stylus arm guide 10 depends from the chart holder end 3 and the stylus arm 11 receives this guide 10 and is guided thereby with the arm telescoping over the guide. This arm mounts the upwardly extending stylus spring 12 having the stylus 13 which presses radially outwardly against the inside of the chart when the chart is mounted inside the cylindrical bore 2 of the chart holder. The centralizing spring 14 centralized the stylus arm 12 respecting the stylus arm guide 10.

The push rod 7 is moved downwardly by the usual clockwork mechanism above the illustrated parts at a steady known rate. The stylus arm is rotated by a mechanism below the illustrated parts and actuated by the pressure outside of the housing 9.

According to the present invention the cylindrical bore 2 of the chart holder 1 does not have ridges, projections or other chart positioning or anchoring means. As usual the stylus 13 presses into the metal chart hard enough to engrave the record on its surface; but the present invention adequately positions the chart against twisting spirally even though the circumferential frictional restraint providing the reaction to the stylus is effected solely by the relatively short circumferential areas of the chart and holder bore interfaces.

With the ability to eliminate the need for ridges, T-bars or the like, the manufacturing cost is materially reduced. Any such devices must be made and installed by expensive precision manufacturing methods.

Figure 3:
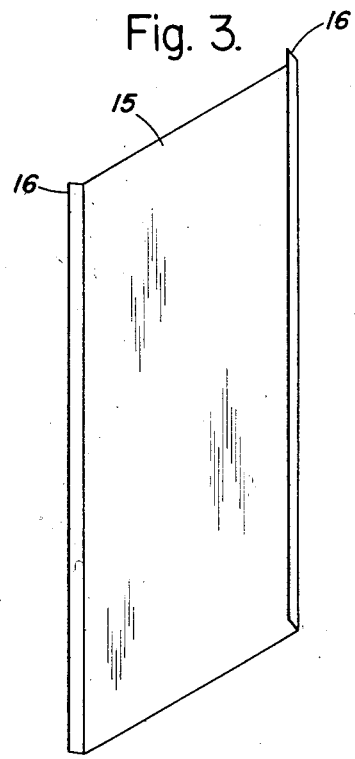
Fig. 3 shows the tubular chart in its normally flat condition it has prior to insertion in the chart holder.
Figure 2:
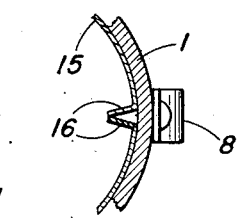
Fig. 2 is a cross section taken from the line 2—2 in Fig. 1.

In accordance with the invention the record chart shown in its normally flat condition by Fig. 3 and as mounted by the holder in Fig. 2 is constructed in a novel manner. This chart comprises a substantially flat sheet body 15 having oppositely spaced substantially parallel flange edge portions 16 angling outwardly from the face of the sheet body 15. The face is the side of the sheet body on which the record is made by the recording tool, which in the illustrated example is the stylus 13.

This sheet body 15 is normally substantially flat when unrestricted by deformation force. It is, however, elastically deformable by force to a cylinder or tube with the flanges 16 arranged inside as shown by Fig. 2. The body portion 15 has enough spring-back, elastic recovery or inherent ability to return towards the position from which it was deformed, to return a substantial distance towards flatness when the cylindrical forming force is released.

The flanges 16 are elastically deformable by force to mutually press each other to radial positions when the body 15 is forced to a cylinder. The flanges have enough springback, elastic recovery, or inherent ability to return substantial distances toward their outwardly angling positions when they are released from each other.

The chart body and flange portions are integrally formed from a sheet of metal of from about .0015" to .005" thick and are made from tempered copper, brass, or aluminum or its alloys. Other materials may be used having comparable physical characteristics, particularly respecting elasticity.

Figure 4:
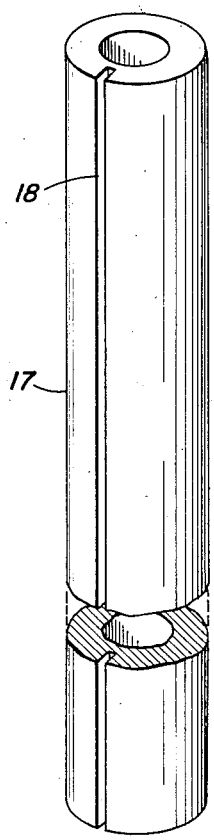
Fig. 4 is a perspective of a tool which may be used to insert and remove the chart from the holder.
Figure 5:
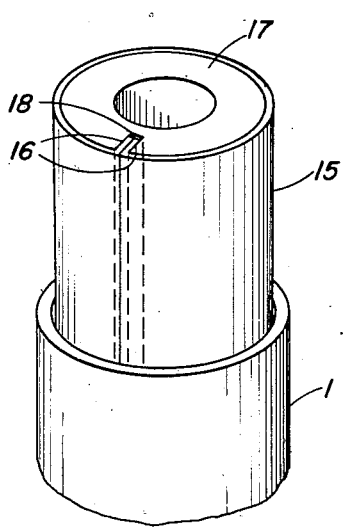
Fig. 5 is a perspective showing this tool in use.

The tool shown by Fig. 4 and in use by Fig. 5 comprises a mandrel 17 providing an outside cylindrical surface having a circumference substantially equaling that of the body portion 15 of the chart when this body is forced to a cylinder with the flanges 16 substantially radial and pressed together. The length of this body portion 15 between the flanges 16 is made just slightly less than the circumference of the cylindrical inside of the chart holder's bore, and the angularity of the flanges 16 and their widths or lengths between their bases and outermost edges are correlated so that the outer edges are spaced apart from each other across the body 15 a distance slightly greater than the circumferential distance of a cylinder concentric the cylindrical bore 2 and tangent to these outer edges.

When the chart 15 is forced to a tube with the flanges 16 pressed to truly radial positions and hence intercontacting throughout their entire areas the diameter of the resulting tubular chart form is slightly less than the inside diameter of the bore 2. The outside diameter of the mandrel 17 is made as a cylinder having this relatively smaller diameter. The mandrel has a longitudinally extending groove 18 for receiving the flanges 16 and is otherwise adapted to carry the chart during its insertion and removal in the chart holder.

In Fig. 5 the chart is shown wrapped around the mandrel 17 with its flanges pressed radially together and with the chart and mandrel being slid into the bore 2 of the chart holder 1. The chart may be manually wrapped around the mandrel 17 and swung with its flanges together so as to fit tightly against the cylindrical outside surface of the mandrel. The mandrel and chart may then be slid easily into the bore 2.

Removal is effected by inserting the mandrel into the bore 2 and then pushing out both the chart and the mandrel together from the bore 2. The chart holder end 3 is removable from the chart holder to give access to both ends of the bore 2.

While the chart is in the bore 2 of the chart holder 1 its side edge or flange portions 16 are mutually adjacent and are of course permanently bent inwardly to form the longitudinally extending flanges that normally angle more sharply away from the circular portion or body 15 of the chart. The outer edges of these flanges 15 intercontact and thus elastically spring each other backwardly.

The physical characteristics of the chart are such that its deformation to the cylindrical tube shape does not effect permanent deformation of the metal. Therefore, the chart is elastically trying to spring straight with the inside of the bore 2 providing the reaction to the elastic force. Hence the chart naturally assumes the form of a true cylinder throughout all but its portions adjacent the flanges 15. This is due to the chart acting as a strained beam spring exerting radial pressure against the cylindrical bore. These end portions adjacent the flanges 16 are those that previously tended to panel, but with the flanges deformed they are acting as two cantilever springs or like a semi-elliptic spring and they are applying circumferential force to the chart portions that tend to panel. This circumferentially applied force forces these longitudinally extending side portions to press radially against the bore and to hence completely assume a cylindrical shape that is as truly cylindrical as is the bore 2 of the chart holder.

It follows that with the present invention when the stylus 13 works up to either of the longitudinally extending edge portions of the chart a true record is obtained. The stylus works on one of these portions in the commercial instrument. Hence the recording pressure gauge is made more useful in surveying oil well pressures. The mandrel shown by Fig. 4 permits easy insertion and removal of the chart in the field without undue difficulties. The chart is thin and easily bent permanently particularly when its elastic limit is just slightly higher than is required to provide the elastic springing to its tubular shape. In this connection it may be that the chart is made of metal that permanently deforms somewhat when bent to the cylindrical shape particularly when left in the cylindrical condition for a prolonged period of time. In such instances the principles of the present invention are operative if the chart maintains sufficient spring-back throughout its body portion 15 and flanges 16 to continue to apply the necessary radial force.

Since the chart engages the inside of the chart holder throughout its circumferential area, the chart is firmly anchored against twisting as the stylus works from one of the tubular chart ends to the other. Therefore no longitudinal ridges or the like are required to resist the torque exerted by the stylus. It is to be understood that the chart may have either a plain metal surface into which the stylus cuts or that it may be provided with a coating of paint, enamel or the like into which the stylus cuts.

The spring action of the flanges is wide enough in range to accommodate slight variations in the parallel relation of the flanged edges. Such slight inaccuracies do not affect the operation of the invention when within normal tolerance ranges common to chart making. The charts do not need to be precision products to any unusual degree.

I claim:

1. A recorder assembly including in combination a chart holder having a substantially cylindrical bore for holding the chart, a recording tool mounted in said bore to work against a chart held therein, means for relatively moving said holder and tool in recording directions, and a normally substantially flat chart made of elastic material and fitted inside said bore by being elastically bent to conform substantially to its shape with its side edge portions mutually adjacent and permanently bent inwardly to form longitudinally extending flanges that normally angle more sharply away from the central portion of said chart and which have their outer edge portions intercontacting and thus elastically springing each of said flanges backwardly, said spring flanges applying force circumferentially to said chart forcing its portions adjacent thereto to press radially against said bore.

2. The combination of a tubular chart holder having a substantially cylindrical inside and a chart with opposite side edge flanges, said chart having its body extending between the bases of said flanges a distance slightly less than the circumferential distance of said cylindrical inside and said flanges being angled outwardly so their outer edges are spaced apart a distance slightly greater than the circumferential distance of a cylinder concentric said cylindrical inside and tangent to said outer edges, said chart being made of material rendering it elastically deformable to a cylinder fitting said cylindrical inside and formed thereby by said chart pressing radially thereagainst due to its elastic reaction to the resulting beam stress aided adjacent said flange bases by the elastic reaction due to mutual elastic deflection of said flanges applying circumferential force to said chart, said chart when deformed to a cylinder with said flanges deflected elastically by external force to mutually parallel relationship being freely insertable and removable into and from said cylindrical inside.

3. A chart adapted for mounting in the cylindrical chart-carrying bore of a tubular chart holder, said chart comprising a substantially flat sheet body having oppositely spaced substantially parallel flange edge portions angling outwardly from the face of said sheet body, said sheet body being normally substantially flat and being elastically deformable by force to a cylinder with said flanges inside and with said body having enough spring-back to return a substantial distance towards flatness when said force is released, said flanges being elastically deformable by force to mutually press each other to radial positions when said body is forced to a cylinder with said flanges inside and with enough spring-back to return substantial distances towards their outwardly angling positions when they are released from each other, said face being adapted to be marked by a recording tool.

4. The combination of a tubular chart holder having a substantially cylindrical inside and a chart with opposite side edge flanges, said chart having its body extending between the bases of said flanges a distance slightly less than the circumferential distance of said cylindrical inside and said flanges being angled outwardly so their outer edges are spaced apart a distance slightly greater than the circumferential distance of a cylinder concentric said cylindrical inside and tangent to said outer edges, said chart being made of material rendering it elastically deformable to a cylinder fitting said cylindrical inside and formed thereby by said chart pressing radially thereagainst due to its elastic reaction to the resulting beam stress aided adjacent said flange bases by the elastic reaction due to mutual elastic deflection of said flanges applying circumferential force to said chart, said chart when deformed to a cylinder with said flanges deflected elastically by external force to mutually parallel relationship being freely insertable and removable into and from said cylindrical inside, and a mandrel providing an outside cylindrical surface having a circumference substantially equaling that of said body when forced to a cylinder with said flanges substantially radial and pressed together, and with said mandrel outside cylindrical surface having a longitudinally extending groove formed therein and adapted to receive said flanges, said mandrel being otherwise adapted to carry said chart during its insertion and removal as described herein.

CARL H. W. HARTMANN.

REFERENCES CITED

The following references are of record in the file of this patent:

UNITED STATES PATENTS

| Number | Name | Date |
| --- | --- | --- |
| 691,588 | Bosworth | Jan. 21, 1902 |
| 2,015,851 | Herrick et al. | Oct. 1, 1935 |
| 2,153,917 | Exline | Apr. 11, 1939 |
| 2,167,417 | Chappell et al. | July 25, 1939 |
| 2,539,009 | Chaney et al. | Jan. 23, 1951 |